United States Patent
Tsukidate et al.

(10) Patent No.: US 9,810,093 B2
(45) Date of Patent: Nov. 7, 2017

(54) GAS TURBINE AND GAS TURBINE POWER FACILITIES

(71) Applicant: Mitsubishi Hitachi Power Systems, Ltd., Yokohama, Kanagawa (JP)

(72) Inventors: Hironori Tsukidate, Hitachi (JP); Hidetoshi Kuroki, Hitachi (JP); Atsushi Sano, Hitachinaka (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 715 days.

(21) Appl. No.: 13/768,579

(22) Filed: Feb. 15, 2013

(65) Prior Publication Data

US 2013/0259656 A1     Oct. 3, 2013

(30) Foreign Application Priority Data

Mar. 29, 2012   (JP) .................. 2012-077688

(51) Int. Cl.
*F01D 25/00* (2006.01)
*F02C 7/36* (2006.01)

(52) U.S. Cl.
CPC ............... *F01D 25/00* (2013.01); *F02C 7/36* (2013.01); *Y02E 20/16* (2013.01)

(58) Field of Classification Search
CPC ... F02C 7/36; F01D 5/026; F01D 5/06; F01D 5/063; F01D 5/066; F01D 13/003; F01D 25/28; F01D 25/285
See application file for complete search history.

(56) References Cited

U.S. PATENT DOCUMENTS

| | | | |
|---|---|---|---|
| 7,281,308 B2* | 10/2007 | Ashar ................ | F01D 25/285 29/402.08 |
| 8,001,790 B2* | 8/2011 | Ichiryu ................ | F01D 25/28 60/796 |
| 8,049,353 B1* | 11/2011 | Eng ..................... | F01D 15/10 290/1 A |

FOREIGN PATENT DOCUMENTS

JP     2003-138911 A     5/2003
JP     2008-184966 A     8/2008

OTHER PUBLICATIONS

Japanese Office Action issued in counterpart Japanese Application No. 2012-077688 dated May 7, 2014 (four pages).

* cited by examiner

*Primary Examiner* — Justin Seabe
(74) *Attorney, Agent, or Firm* — Crowell & Moring LLP

(57) ABSTRACT

Disclosed is a gas turbine and a gas turbine power facility which flexibly accommodate changes in layout of devices and in user's needs.
This invention includes an air compressor 1; a turbine 2 coaxially coupled to the compressor 1; a turbine casing 4 accommodating the compressor 1 and the turbine 2; a compressor output shaft 23 for coupling rotary devices including a power generator 200, the compressor output shaft 22 protruding from the turbine casing 4 towards the compressor 1; and a turbine output shaft 23 for coupling the rotary devices, the turbine output shaft 23 protruding from the turbine casing 4 towards the turbine 2.

6 Claims, 8 Drawing Sheets

GAS TURBINE AND GAS TURBINE POWER FACILITIES

BACKGROUND OF THE INVENTION

1. Field of the Invention

The present invention relates to a gas turbine and gas turbine power facilities.

2. Description of the Related Art

In gas turbine power facilities used at electric power plants and the like, power generators may be arranged at a compressor side of gas turbines to allow for the optimization of layout and the improvement of efficiency. For the same reasons, in combined cycle facilities used at electric power plants, power generators and steam turbines may also be arranged at a compressor side of gas turbines. JP-2003-0138911-A, for example, discloses the latter case. Connecting devices to the compressor side of a gas turbine, as in the above cases, enables impacts of thermal expansion of the gas turbine to be reduced, while at the same time, improving performance of the gas turbine with its exhaust casing used as an axial exhaust flow structure.

SUMMARY OF THE INVENTION

Whether a power generator, a steam turbine, and the like are to be connected to the compressor side of a gas turbine or the turbine side thereof is commonly predetermined by the type of gas turbine.

The layout of power generator plant devices, however, is restricted by dimensions of their installation locations, and part of these devices may therefore require installation at non-planned locations in gas turbine power facilities of an axial exhaust flow structure, for example. The user's demand about the layout may also be subject to sudden change. Attempting the sequential design and manufacture of the gas turbine in response to the change in the layout of the power plant devices will significantly increase the number of parts required for the gas turbine, and the time required for its design and manufacture.

The present invention has been made with the above circumstances in mind, and an object of the invention is to provide a gas turbine and a gas turbine power facility which flexibly accommodate changes in layout of devices and in user's needs.

In order to attain the above object, an aspect of the present invention includes: a compressor output shaft for coupling rotary devices including a power generator, the compressor output shaft protruding from the turbine casing towards the compressor; and a turbine output shaft for coupling the rotary devices, the turbine output shaft protruding from the turbine casing towards the turbine.

In accordance with the present invention, changes in layout of devices and in user's needs are flexibly accommodated.

DESCRIPTION OF THE PREFERRED EMBODIMENTS

Hereunder, embodiments of the present invention will be described with reference to the accompanying drawings.

First Embodiment

Figure 1:
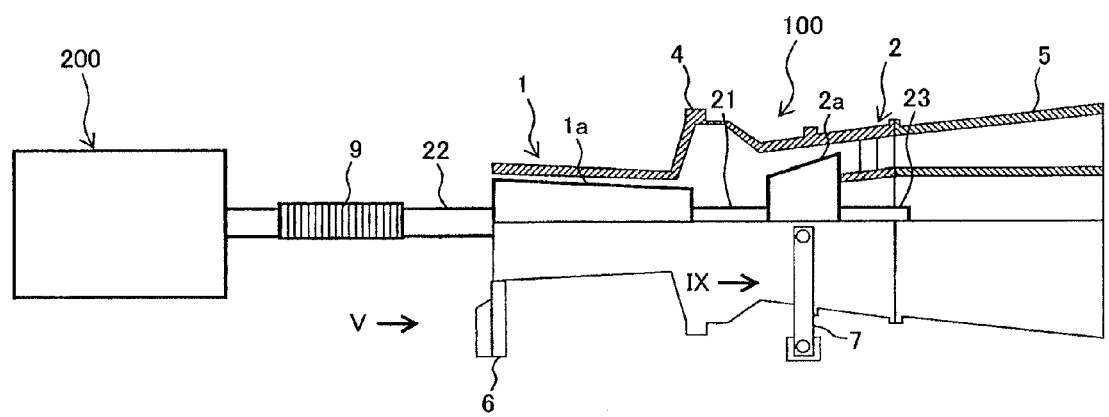
FIG. 1 is a schematic representing partly in section an overall structure of a gas turbine power facility according to a first embodiment of the present invention, and shows a configuration with a power generator and the like coupled to a compressor side of a gas turbine.

FIG. 1 is a schematic representing partly in section an overall structure of a gas turbine power facility according to a first embodiment of the present invention, and shows a configuration with a power generator and the like coupled to a compressor side of a gas turbine.

The gas turbine power facility shown in FIG. 1 includes a gas turbine 100 and a power generator 200 connected to the gas turbine 100.

The gas turbine 100 includes a compressor 1 that compresses air, and a turbine 2 that drives the compressor 1. The compressor 1 and the turbine 2 share a casing 4. The casing 4 is a tubular member, accommodating a compressor rotor 1a of the compressor 1 and a turbine rotor 2a of the turbine 2. The compressor rotor 1a and the turbine rotor 2a are coaxially coupled via an intermediate shaft 21. Although not shown, a plurality of combustors arranged annularly on an outer periphery of the casing 4 of the compressor 1 are equipped in the gas turbine 100. The combustors each burn a fuel with the air that has been compressed by the compressor 1, and generate combustion gases. The combustion gases from the combustors drive the turbine 2 to rotate.

Figure 2:
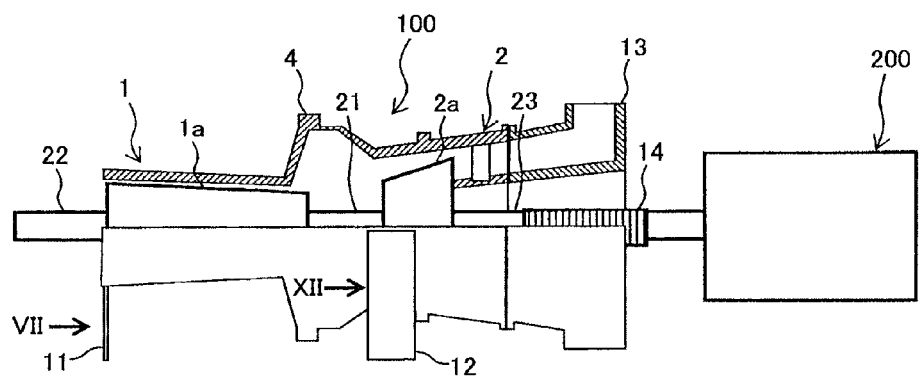
FIG. 2 is another schematic representing partly in section the overall structure of the gas turbine power facility according to the first embodiment of the present invention, and shows a configuration with a power generator and the like coupled to a turbine side of a gas turbine.

The compressor rotor 1a is equipped with a compressor output shaft 22 to couple rotary devices including the generator 200. The compressor output shaft 22 is coaxial with the intermediate shaft 21, and protrudes from the casing 4 towards the compressor 1, that is, towards a side opposite to the turbine 2. The turbine rotor 2a is equipped with a turbine output shaft 23 to couple the rotary devices. The turbine output shaft 23 is coaxial with the intermediate shaft 21 and the compressor output shaft 22, and protrudes from the casing 4, towards the turbine 2, that is, towards a side opposite to the compressor 1. The rotary devices are selectively coupled to one of the compressor output shaft 22 and the turbine output shaft 23. A configuration with the generator and the like coupled to the turbine side of the gas turbine 100 is shown in FIG. 2.

In addition to the generator 200 and other driven machines, the rotary devices herein may include a speed reducer, a turning device, a start-up device, and other rotary devices (such as a steam turbine in a combined cycle), none of these machines and devices not being herein shown. FIGS. 1 and 2 show exemplary configurations with an input shaft of the generator 200 directly coupled to the compressor output shaft 22 or the turbine output shaft 23 via a coupling 9 or 14, respectively. If a speed reducer is to be used, however, the generator 200 is coupled to the compressor output shaft 22 or the turbine output shaft 23 via the speed reducer. A turning device and a start-up device are usually coupled to the speed reducer via a gear (not shown) and may be built into the speed reducer. The couplings 9, 14 can each be made a common part, only if formed into the same geometry as that of sections to be coupled to couplings of the compressor output shaft 22 and the turbine output shaft 23. The rotary devices are also supported from a foundation by a support member, neither the foundation nor the support member being shown.

In addition, depending upon whether the rotary devices are to be connected to the compressor output shaft 22 or the turbine output shaft 23, either an exhaust casing of an axial exhaust flow structure or an exhaust casing of a radial exhaust flow structure is selectively fitted at one end into the casing 4. More specifically, for the connection of the rotary devices to the compressor output shaft 22, since this connection creates a space at an exhaust side of the turbine, the exhaust casing 5 having the axial exhaust flow structure formed so that emissions from the turbine 2 are discharged in a centrally axial direction of the turbine can be connected to the turbine 2 side of the casing 4. Conversely for the connection of the rotary devices to the turbine output shaft 23, since this connection makes it necessary for emissions to be discharged in a direction that the rotary devices are absent, the exhaust casing 13 having the radial exhaust flow structure formed so that the emissions from the turbine 2 are discharged in a radial direction of the turbine 2 can be connected to the turbine side of the casing 4. The exhaust casings 5, 13 both include an annularly formed exhaust flow channel.

Figure 3:
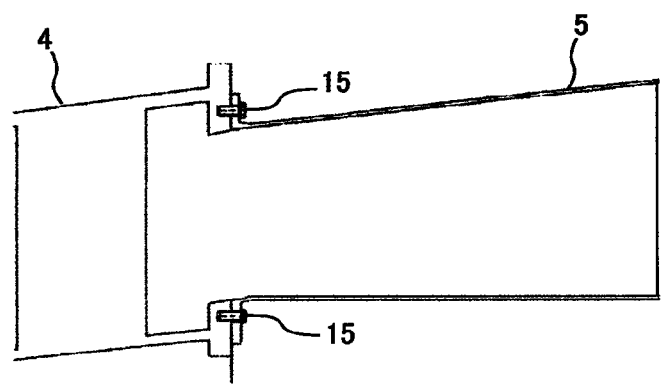
FIG. 3 is a schematic that represents installation construction of an exhaust casing of an axial exhaust flow structure with respect to the gas turbine according to the first embodiment of the present invention.
Figure 4:
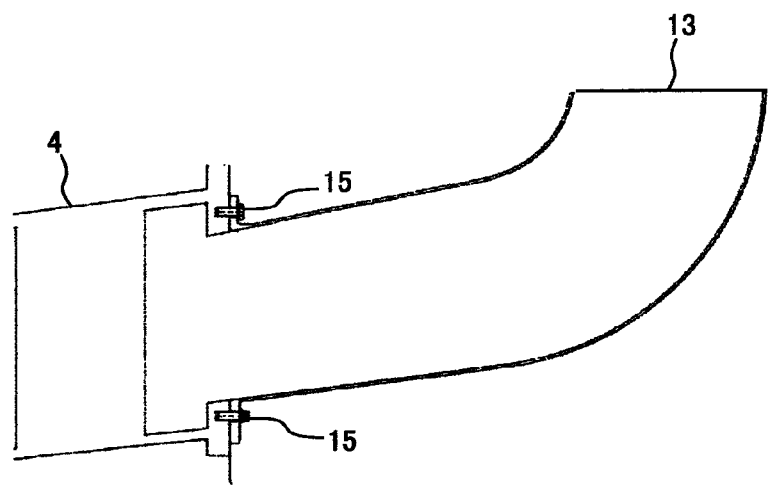
FIG. 4 is a schematic that represents installation construction of an exhaust casing of a radial exhaust flow structure with respect to the gas turbine according to the first embodiment of the present invention.

FIG. 3 is a schematic that represents installation construction of the exhaust casing 5 having the axial exhaust flow structure, and FIG. 4 is a schematic that represents installation construction of the exhaust casing 13 having the radial exhaust flow structure. Both figures show a vertical section including the central axis of the turbine 2, in an upper-half side of the turbine 2.

As shown in these figures, the exhaust casings 5, 13 are of the same installation construction with respect to the casing 4, and each casing is fastened to an exhaust section of the casing 4 by means of bolts 15 provided in two rows, one row on an inner periphery and the other row on an outer periphery. Thus, irrespective of whether the exhaust casing 5 or the exhaust casing 13 is to be installed, the exhaust casing can be connected to the turbine casing 4 in the same manner. The installation construction of the exhaust casing 5 having the axial exhaust flow structure is only shown as an example in FIG. 3, and likewise the installation construction of the exhaust casing 13 having the radial exhaust flow structure is only shown as an example in FIG. 4. Any other configuration can therefore be adopted, only if the configuration permits either the exhaust casing of the axial exhaust flow structure or the exhaust casing of the radial exhaust flow structure to be selectively connected to the casing 4.

Figure 6:
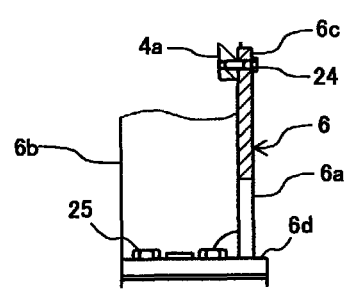
FIG. 6 is a cross-sectional view of the support member and periphery, taken along line VI-VI in FIG. 5.
Figure 10:
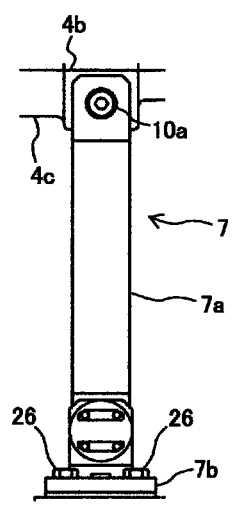
FIG. 10 is an external view of the support member and periphery as viewed from a direction of arrow X in FIG. 9.

The casing 4 is equipped with a compressor end mounting section on a section close to the compressor 1, and a turbine end mounting section on a section close to the turbine 2, the former mounting section being equivalent to a flange 4a shown in FIG. 6, and the latter mounting section being equivalent to a turbine end mounting section shown in FIG. 10. As shown in FIGS. 1 and 2, depending upon whether the rotary devices are to be connected to the compressor output shaft 22 or the turbine output shaft 23, the support member 6 of the rigid structure in FIG. 1 or the support member 11 of the flexible structure in FIG. 2 is mounted at the compressor end mounting section. That is to say, the support member 6 of the rigid structure and the support member 11 of the flexible structure are provided as a pair so that either can be selected and then mounted at the compressor end mounting section. Similarly, as shown in FIGS. 1 and 2, depending upon whether the rotary devices are to be connected to the compressor output shaft 22 or the turbine output shaft 23, the support member 7 of the flexible structure in FIG. 1 or the support member 12 of the rigid structure in FIG. 2 is mounted at the turbine end mounting section. That is to say, the support member 7 of the flexible structure and the support member 12 of the rigid structure are provided as a pair so that either can be selected and then mounted at the turbine end mounting section.

The rigid structure support members 6, 12 are both constructed to be mounted at the compressor end mounting section or the turbine end mounting section, whichever is the closer to the rotary devices. Conversely, the flexible structure support members 7, 11 are both constructed to be mounted at the compressor end mounting section or the turbine end mounting section, whichever is the more distant from the rotary devices. To be more specific, if the rotary devices are connected to the compressor output shaft 22, the rigid structure support member 6 is mounted at the compressor end mounting section and the flexible structure support member 7 is mounted at the turbine end mounting section. Conversely if the rotary devices are connected to the turbine output shaft 23, the flexible structure support member 11 is mounted at the compressor end mounting section and the rigid structure support member 12 is mounted at the turbine end mounting section. To make an additional remark, the rigid structure support member 6 and the flexible structure support member 7 are used in a pair to connect the rotary devices to the compressor output shaft 22. Conversely the flexible structure support member 11 and the rigid structure support member 12 are used in a pair to connect the rotary devices to the turbine output shaft 23.

Figure 5:
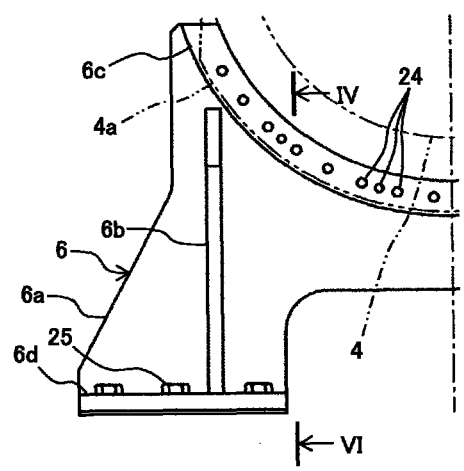
FIG. 5 is an external view representing installation construction of a rigid structure support member with respect to a compressor end mounting section in the gas turbine according to the first embodiment of the present invention, and shows the support member and periphery as viewed from a direction of arrow V in FIG. 1.

FIG. 5 is an external view representing the installation construction of the rigid structure support member with respect to the compressor end mounting section, and shows the support member and periphery as viewed from a direction of arrow V in FIG. 1. FIG. 6 is a cross-sectional view of the support member and periphery, taken along line VI-VI in FIG. 5. In FIGS. 5 and 6, the members that have already been described in the other accompanying drawings are each assigned the same reference number or symbol as in the other accompanying drawings, and description of these members is omitted hereunder. Only a left half of the rigid structure support member as viewed from a direction of the generator 200 in FIG. 1 is shown in FIG. 5, and a right half of the rigid structure support member 6 is not shown since the support member is of left-right symmetrical construction with respect to the construction shown in FIG. 5.

As shown in FIGS. 5 and 6, at the compressor side of the casing 4, the flange 4*a* is provided near a lower half of the casing 4. The flange 4*a* is equivalent to the compressor end mounting section described above. The rigid structure support member 6 to be selected alternatively to the flexible structure support member 11 and mounted to the flange 4*a*, or the compressor end mounting section, includes a support body 6*a* that supports the casing 4, and a rib 6*b* that strengthens the body 6*a* for improved rigidity. The body 6*a* is a plate-shaped member disposed along a surface orthogonal to the central axis of the turbine, and has a plate thickness sufficient to support at least a weight of a compressor-side section of the gas turbine 100. The body 6*a* has an upper edge serving as a flange 6*a* recessed in a circular arc form with respect to the flange 4*a* when seen from the centrally axial direction of the turbine. Fastening the flange 6*a* to the flange 4*a* at the turbine casing 4 side using a plurality of bolts 24 couples the rigid structure support member 6 to a lower section of the casing 4. In addition, at a lower end of the body 6*a*, a horizontal base 6*d* formed using a plate-shaped member is secured by welding or the like, and fastening the base 6*d* to a foundation (not shown) with a plurality of bolts 25 fixes the rigid structure support member 6 to the foundation. The rib 6*b* is a plate-like strengthening member standing upright on the base 6*d*, with its surface parallel to the central axis of the turbine, and is secured to both a surface of the body 6*a* that is located at a side opposite to the turbine 2, and an upper surface of the base 6*d*, by welding or the like. Since the body 6*a* having a sufficient plate thickness is strengthened in this form by the rib 6*b*, the rigid structure support member 6 is constructed to resist deflection in the direction of the turbine central axis, in defiance of thermal expansion of the casing 4. The support member 6 is also constructed to easily constrain a movement of the casing 4 in the direction of the turbine central axis as compared with the flexible structure support member 7 used in a pair.

The construction of the rigid structure support member 6, shown in FIGS. 5 and 6, is only an example, and this construction may be replaced by any other construction if the support member 6 is sufficiently rigid to constrain the movement of the casing 4 in the direction of the turbine central axis as compared with the flexible structure support member 7 used in a pair.

Figure 7:
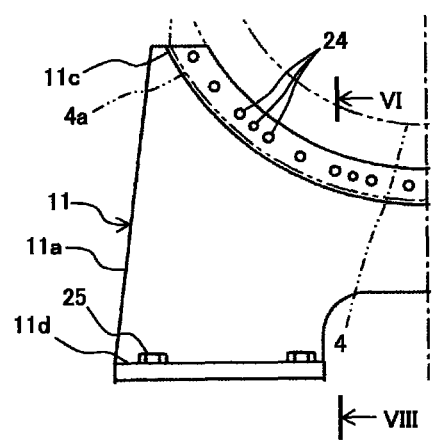
FIG. 7 is an external view representing installation construction of a flexible structure support member with respect to the compressor end mounting section in the gas turbine according to the first embodiment of the present invention, and shows the support member and periphery as viewed from a direction of arrow VII in FIG. 2.
Figure 8:
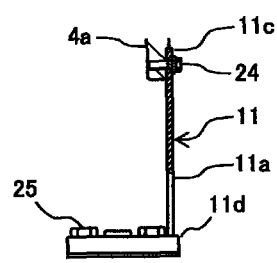
FIG. 8 is a cross-sectional view of the support member and periphery, taken along line VIII-VIII in FIG. 7.

FIG. 7 is an external view representing the installation construction of the flexible structure support member with respect to the compressor end mounting section, and shows the support member and periphery as viewed from a direction of arrow VII in FIG. 2. FIG. 8 is a cross-sectional view of the support member and periphery, taken along line VIII-VIII in FIG. 7. In FIGS. 7 and 8, the members that have already been described in the other accompanying drawings are each assigned the same reference number or symbol as in the other accompanying drawings, and description of these members is omitted hereunder. Only a left half of the flexible structure support member 11 as viewed from a direction opposite to the generator 200 in FIG. 2 is shown in FIG. 7, and a right half of the flexible structure support member 11 is not shown since the support member is of left-right symmetrical construction with respect to the construction shown in FIG. 7.

As shown in FIGS. 7 and 8, the flexible structure support member 11 to be selected alternatively to the rigid structure support member 6 and mounted to the flange 4*a*, or the compressor end mounting section, includes a support body 11*a* that supports the casing 4, and a base 11*d* provided at a lower end of the body 11*a*. The body 11*a* is a member thinner than the body 6*a* of the rigid structure support member 6, but has sufficient strength to support at least the weight of the compressor-side section of the gas turbine 100. The installation construction of the flexible structure support member 11 with respect to the casing 4 is the same as that of the rigid structure support member 6, and fastening a flange 11*c* of a circular arc shape, formed at an upper edge of the body 11*a*, to the flange 4*a* at the turbine casing side by means of the plurality of bolts 24, couples the flexible structure support member 11 to another lower section of the casing 4. The base 11*d* is substantially of the same construction as that of the base 6*d* of the rigid structure support member 6, and is secured to the body 11*a* by welding or the like. Fastening the base 11*d* to the foundation (not shown) with a plurality of bolts 25 fixes the flexible structure support member 11 to the foundation. The body 11*a* of the flexible structure support member 11 is thin as compared with the body 6*a* of the rigid structure support member 6, and the support member 11 is not provided with a rib. The flexible structure support member 11 is therefore constructed to easily deflect in the direction of the turbine central axis, and also to easily follow and absorb the thermal expansion of the casing 4 as compared with the rigid structure support member 12 used in a pair.

The construction of the flexible structure support member 11, shown in FIGS. 7 and 8, is only an example, and this construction may be replaced by any other construction if the support member 11 is strong enough to support the gas turbine 100 and constructed to easily follow and absorb the thermal expansion of the casing 4 as compared with the rigid structure support member 12 used in a pair.

Figure 9:
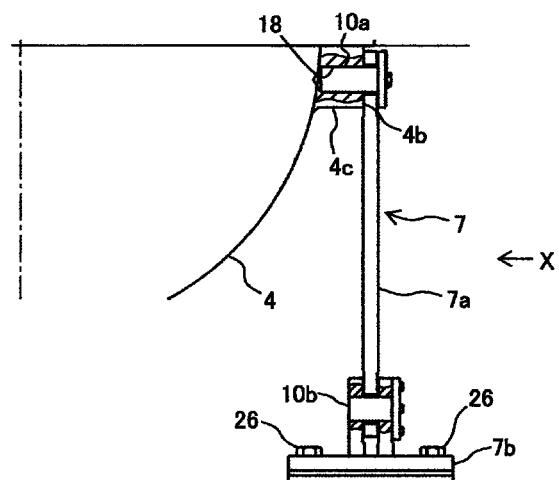
FIG. 9 is an external view representing the installation construction of the flexible structure support member with respect to a turbine end mounting section in the gas turbine according to the first embodiment of the present invention, and is a partly cross-sectional view of the support member and periphery when seen from a direction of arrow IX in FIG. 1.

FIG. 9 is an external view representing the installation construction of the flexible structure support member with respect to the turbine end mounting section, and is a partly cross-sectional view of the support member and periphery when seen from a direction of arrow IX in FIG. 1. FIG. 10 is an external view of the support member and periphery as viewed from a direction of arrow X in FIG. 9. In FIGS. 9 and 10, the members that have already been described in the other accompanying drawings are each assigned the same reference number or symbol as in the other accompanying drawings, and description of these members is omitted hereunder. Only the right half of the flexible structure support member 7 as viewed from the direction opposite to the generator 200 in FIG. 1 is shown in FIG. 9, and the left half of the flexible structure support member 7 is not shown since the support member is of left-right symmetrical construction with respect to the construction shown in FIG. 9.

As shown in FIGS. 9 and 10, at the turbine side of the casing 4, the turbine end mounting section 4b is provided near a lateral portion of an outer periphery of the casing 4. Although not shown in detail, the casing 4 is of upper/lower-half separated construction, with the upper half and lower half of the casing being coupled by a flange at a section which crosses a horizontal surface extending through the central axis of the turbine. An example of providing the turbine end mounting section 4b on a side of the flange 4c for the casing 4 is shown in the present embodiment.

Figure 11:
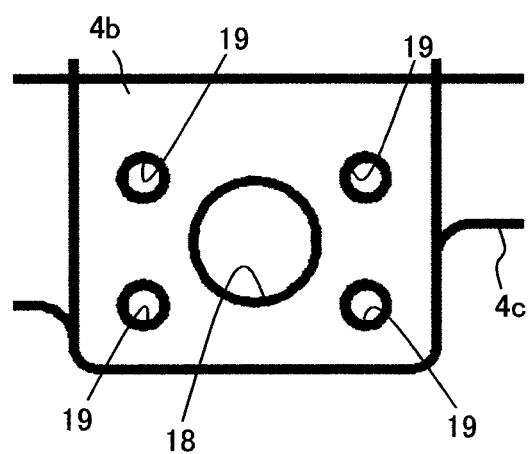
FIG. 11 is a partial, external view of the turbine end mounting section as imaginarily extracted from the external view of FIG. 10.

FIG. 11 is a partial, external view of the turbine end mounting section 4b as imaginarily extracted from the external view of FIG. 10. In FIG. 11, the members that have already been described in the other accompanying drawings are each assigned the same reference number or symbol as in the other accompanying drawings, and description of these members is omitted hereunder.

As shown in FIG. 11, a pin hole 18 and bolt holes 19 are provided in the turbine end mounting section 4b. The plurality of (in the present example, four) bolt holes 19 are arranged around the pin hole 18. The pin hole 18 and the bolt holes 19 all extend in a direction orthogonal to a vertical surface including the central axis of the turbine. Compared with the bolt hole 18, the pin hole 19 has a large diameter.

The flexible structure support member 7 to be selected alternatively to the rigid structure support member 12 and mounted at the turbine end mounting section 4b includes a support body 7a that supports the casing 4 and a base 7b fitted at a lower portion of the body 7a as can be seen from FIGS. 9 to 11. The body 7a is a vertically extending member of a flat bar shape with its surface lying in parallel to the central axis of the turbine, and has a plate thickness sufficient to support at least the weight of a turbine-side section of the gas turbine 100. The body 7a has an upper portion pivotably coupled to the casing 4 via a pin 10a. The pin 10a extends in a direction orthogonal to the body 7a, and is inserted in the pin hole 18 of the turbine end mounting section 4b. The bolt holes 19 (see FIG. 11) in the turbine end mounting section 4b are not used to mount the flexible structure support member 7. The base 7b is pivotably coupled to the lower portion of the body 7a via a pin 10b. The pin 10b extends in the direction orthogonal to the body 7a. The base 7b is fixed to the foundation (not shown) via a plurality of bolts 26. Since the body 7a of the flexible structure support member 7 has the surface oriented in parallel to the turbine central axis, the body 7a itself resists deflection in the direction of the turbine central axis. However, since the body 7a is coupled at its upper and lower portions to the casing 4 and the base 7b via the pins 10a, 10b and constitutes a linkage, the body 7a has enough strength to support the gas turbine 100. At the same time, when the casing 4 thermally expands in the direction of the turbine central axis, the body 7a inclines with the pin 10a, 10b as its fulcrum, and is also constructed to easily follow and absorb the thermal expansion of the casing 4 as compared with the body 6a of the rigid structure support member 6 used in a pair.

The construction of the flexible structure support member 7 shown in FIGS. 10 and 11 is only an example, and this construction may be replaced by any other construction if the support member 7 is strong enough to support the gas turbine 100 and constructed to easily follow and absorb the thermal expansion of the casing 4 as compared with the rigid structure support member 6 used in a pair.

Figure 12:
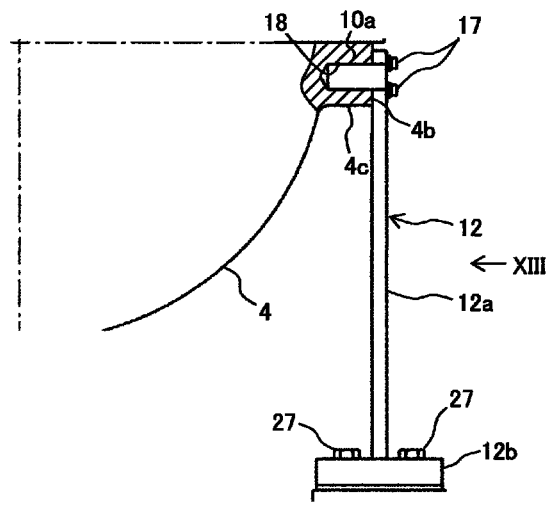
FIG. 12 is an external view representing the installation construction of the rigid structure support member with respect to the turbine end mounting section in the gas turbine according to the first embodiment of the present invention, and is a partly cross-sectional view of the support member and periphery when seen from a direction of arrow XII in FIG. 2.
Figure 13:
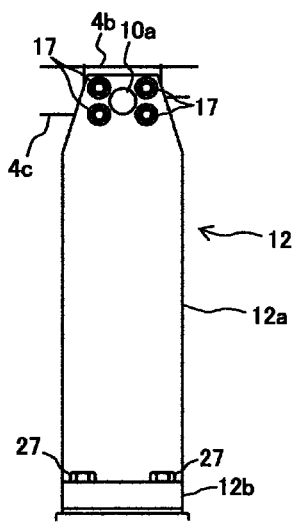
FIG. 13 is an external view of the support member and periphery as viewed from a direction of arrow XIII in FIG. 12.

FIG. 12 is an external view representing the installation construction of the rigid structure support member with respect to the turbine end mounting section, and is a partly cross-sectional view of the support member and periphery when seen from a direction of arrow XII in FIG. 2. FIG. 13 is an external view of the support member and periphery as viewed from a direction of arrow XIII in FIG. 12. In FIGS. 12 and 13, the members that have already been described in the other accompanying drawings are each assigned the same reference number or symbol as in the other accompanying drawings, and description of these members is omitted hereunder. Only the right half of the rigid structure support member 12 as viewed from the direction opposite to the generator 200 in FIG. 2 is shown in FIG. 12, and the left half of the rigid structure support member 12 is not shown since the support member is of left-right symmetrical construction with respect to the construction shown in FIG. 13.

As shown in FIGS. 12 and 13, the rigid structure support member 12 to be selected alternatively to the flexible structure support member 7 and mounted to the turbine end mounting section 4b includes a support body 12a that supports the casing 4, and a base 12b fitted at a lower portion of the body 12a. The body 12a, a vertically extending member of a flat bar shape with its surface lying in parallel to the central axis of the turbine, is wide in the direction of the turbine central axis as compared with the body 7a of the flexible structure support member 7, and has a plate thickness sufficient to support at least the weight of the turbine-side section of the gas turbine 100. The body 12a, as with the body 7a of the flexible structure support member 7, has an upper portion pivotably coupled to the turbine end mounting section 4b of the casing 4 via a pin 10a. In addition, the body 12a is fastened to the turbine end mounting section 4b by means of a plurality of (in the present example, four) bolts 17. The bolts 17 are each threaded down into the bolt holes (see FIG. 11) of the turbine end mounting section 4b. Furthermore, the base 12b is secured to a lower end of the body 12a by welding or the like, and the base 12b is fastened onto the foundation (not shown) via a plurality of bolts 27 to fix the body 12a to the foundation. The body 12a of the rigid structure support member 12 has a wide surface relative to the body 7a of the flexible structure support member 7, resists deflection more significantly than the body 7a, and obviously has enough strength to support the gas turbine 100. Additionally, the upper portion of the body 12a is not merely coupled to the turbine end mounting section 4b, but also rotationally locked against the casing 4 by the bolts 17, and the body 12a is welded at its lower portion onto the base 12b. For these reasons, even when the casing 4 thermally expands in the direction of the turbine central axis, the rigid structure support member 12 refuses to incline, as with the flexible structure support member 7, and is also constructed to easily constrain the axial movement of the casing 4 as compared with the flexible structure support member 11 used in a pair.

The construction of the rigid structure support member 12 shown in FIGS. 12 and 13 is only an example, and this construction may be replaced by any other construction if the support member 12 is strong enough to support the gas turbine 100 and constructed to easily constrain the movement of the casing 4 in the direction of the turbine central axis as compared with the flexible structure support member 11 used in a pair.

In the gas turbine power facility of the above configuration, the generator 200 is driven by the gas turbine 100, thereby generating electricity. After the compressor 1 has compressed air, the gas turbine 100 uses combustors (not shown) to burn the air along with a fuel, and then uses resulting combustion gases to drive the turbine 2. The gas turbine 100, when exposed to a high temperature by the high-temperature high-pressure combustion gases that are a working fluid, suffers a significant change in temperature and hence a certain level of thermal expansion in the direction of the turbine central axis. To suppress impacts of the thermal expansion of the gas turbine 100 upon the generator 200, the gas turbine 100 needs to be supported rigidly at the side to which the generator 200 is connected, and flexibly at the opposite side. Adopting this support construction makes the gas turbine 100 expand from the supporting position at the side closer to the generator 200, towards the side opposite to the generator 200, and thus suppresses the impacts of the thermal expansion of the gas turbine 100 upon the generator 200.

Prior to construction of a gas turbine power facility, if it is predetermined at an early phase whether a generator and other rotary devices (driven elements) are to be connected to a compressor side or a turbine side, a user of the power facility will be able to closely study the layout of the devices, including the support construction described above, and move fabrication/assembly forward. If the above is not predetermined, the user will not be able to put these operations forward. In addition, for example, the user's demand about the layout may be subject to sudden change after the fabrication/assembly operations have been started. If sequential design and manufacture of the gas turbine in response to the change in the layout of the power facility are attempted, this will significantly increase the number of parts required for the gas turbine, and the time required for its design and manufacture.

In contrast to this, in the gas turbine power facility of the present embodiment, the output shaft 22, 23 to which the generator 200 and other rotary devices are to be connected are equipped at both of the compressor side and the turbine side, this arrangement enabling selective connection of the rotary devices to either side. In other words, irrespective of whether the generator 200 and other rotary devices are to be connected to the compressor output shaft 22 or the turbine output shaft 23, changes in layout of the devices can be flexibly accommodated later, so before it becomes clear to which of the above two sides the generator 200 and other rotary devices are to be connected, fabrication/assembly of the gas turbine 100 can be advanced. Changes in user's needs, including those of the layout of the devices after a start of fabrication/assembly, can also be flexibly met. Additionally, flexible and relatively speedy response to changes in specifications is achievable.

The generator 200 cannot only be selectively connected to either the compressor output shaft 22 or the turbine output shaft 23. Gas turbine support construction and the exhaust casing can also be flexibly geared to the disposition of the generator 200. More specifically, first, either of the rigid structure support member 6 and the flexible structure support member 11 can be mounted to the flange 4a that is the compressor end mounting section in the same manner. Either of the rigid structure support member 7 and the flexible structure support member 12 can also be selectively mounted to the turbine end mounting section 4b. The exhaust casings 5, 13 can also be selectively mounted to the casing 4 in the same manner. The gas turbine power facility as a whole, therefore, is flexibly responsive to changes in the layout of the devices, for example, and allows not only response to changes in specifications but also the fabrication/assembly of the gas turbine to be advanced within a short period of time.

Second Embodiment

Figure 14:
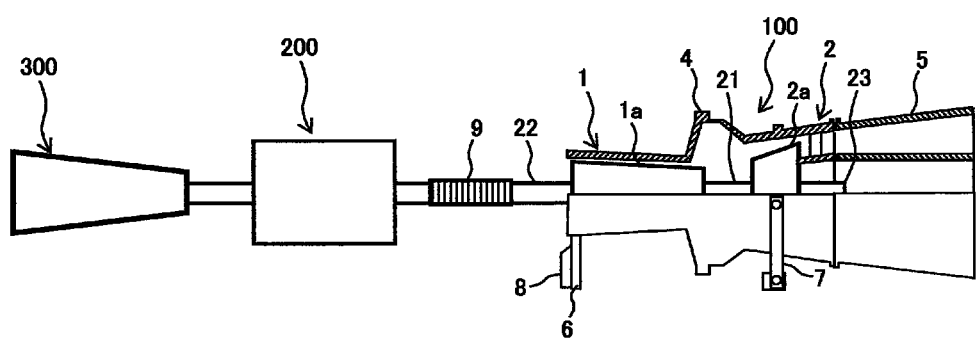
FIG. 14 is a schematic representing partly in section an overall structure of a gas turbine power facility according to a second embodiment of the present invention, and shows a configuration with a power generator and the like coupled to a compressor side of a gas turbine.
Figure 15:
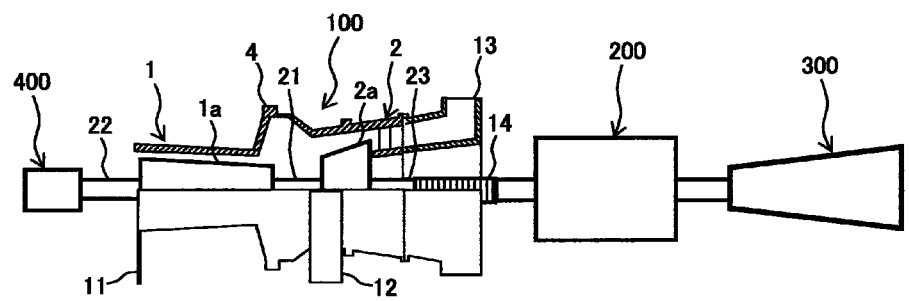
FIG. 15 is another schematic representing partly in section the overall structure of the gas turbine power facility according to the second embodiment of the present invention, and shows a configuration with a power generator and the like coupled to a turbine side of a gas turbine.

FIGS. 14 and 15 are schematics representing partly in section an overall structure of a gas turbine power facility according to a second embodiment of the present invention. FIG. 14 shows a configuration with a power generator and the like coupled to a compressor side of a gas turbine, and FIG. 15 shows a configuration with a power generator and the like coupled to a turbine side of a gas turbine. In FIGS. 14 and 15, the members that have already been described in the other accompanying drawings are each assigned the same reference number or symbol as in the other accompanying drawings, and description of these members is omitted hereunder.

The second embodiment differs from the first embodiment in that whereas the simple cycle power facility using the gas turbine 100 to drive the generator 200 and other rotary devices is described in the first embodiment, a combined cycle power facility is described in the second embodiment. More specifically, a gas turbine facility of the present embodiment includes a gas turbine 100, rotary devices connected to the gas turbine 100 such as a power generator 200, and a steam turbine 300 connected to the gas turbine 100 via the rotary devices.

In the present embodiment, for connection of the generator 200 and the like to a compressor output shaft 22, as shown in FIG. 14, the steam turbine 300 is disposed, along with the generator 200, at an air intake side and connected coaxially with the gas turbine 100 and the generator 200. In this case, an installation form of a rigid structure support member 6, a flexible structure support member 7, and an exhaust casing 5, with respect to a turbine casing 4, is substantially the same as in the example of FIG. 1. For connection of the generator 200 and the like to a turbine output shaft 23, as shown in FIG. 15, the steam turbine 300 is disposed, along with the generator 200, at an exhaust side and connected coaxially with the gas turbine 100 and the generator 200. In this case, an installation form of the rigid structure support member 6, the flexible structure support member 7, and the exhaust casing 5, with respect to the turbine casing 4, is substantially the same as in the example of FIG. 1.

It goes without saying that although not shown, a steam generator (e.g., boiler) that drives the steam turbine 300 is provided. Emissions from the gas turbine 100 may be used as a heat source for the steam generator. In addition, while FIG. 15 shows an example in which a start-up device 400 is connected to the compressor output shaft 22 separately from the generator 200 and the like, the start-up device 400 can naturally be installed at the exhaust side along with the generator 200 and the like. All other structural/configurational aspects are substantially the same as those of the first embodiment.

The present invention can also be applied to a combined cycle power facility as in the present embodiment, and substantially the same advantageous effects as those of the first embodiment can also be obtained in that case.

The embodiments described above are only typical configurational/structural examples of the gas turbine power facility according to the present invention, and the invention can be embodied in various modes without departing from the technical philosophy thereof. For instance, the configuration with the casing 4 supported at both of the compressor end mounting section (flange 4a) and the turbine end mounting section 4b has been described as an example, but the casing 4 may be supported at three places or more. When the number of elements to be supported is increased, the mounting section closest to the generator 200 will be rigidly supported by a rigid structure support member, and all other elements to be supported will be flexibly supported by flexible structure support members.

What is claimed is:

1. A gas turbine comprising:
   an air compressor,
   a turbine coaxially coupled to the compressor,
   a turbine casing accommodating the compressor and the turbine,
   a compressor output shaft protruding from the turbine casing towards a side opposite to the turbine,
   a turbine output shaft protruding from the turbine casing towards a side opposite to the compressor,
   a compressor side mounting section provided at a section of the turbine casing that is near the compressor;
   a turbine side mounting section provided at a section of the turbine casing that is near the turbine, and
   a rigid structure support member and a flexible structure support member that are used as a pair, wherein:
   only one of the compressor output shaft and the turbine output shaft is connected to a rotary device,
   the rigid structure support member is mounted to the compressor side mounting section or the turbine side mounting section, whichever is closer to the rotary device,
   the flexible structure support member is mounted to the compressor side mounting section or the turbine side mounting section, whichever is more distant from the rotary device, and
   the rigid structure support member is more rigid than the flexible structure support member.

2. The gas turbine according to claim 1, wherein:
   the rigid structure support member is fixedly mounted to one of the compressor side mounting section and the turbine side mounting section, and the flexible structure support member is pivotably mounted to the other of the compressor side mounting section and the turbine side mounting section.

3. The gas turbine according to claim 1, further comprising any one of:
   a first exhaust casing of an axial exhaust flow structure, the first exhaust casing being fitted at the turbine casing when the rotary device is connected to the compressor output shaft; and
   a second exhaust casing of a radial exhaust flow structure, the second exhaust casing being fitted at the turbine casing when the rotary device is connected to the turbine output shaft.

4. A gas turbine power facility comprising:
   the gas turbine of claim 3; and
   the rotary device connected to the gas turbine.

5. A gas turbine power facility comprising:
   the gas turbine of claim 3;
   the rotary device connected to the gas turbine; and
   a steam turbine connected to the gas turbine via the rotary device.

6. The gas turbine according to claim 2, further comprising any one of:
   a first exhaust casing of an axial exhaust flow structure, the first exhaust casing being fitted at the turbine casing when the rotary device is connected to the compressor output shaft; and
   a second exhaust casing of a radial exhaust flow structure, the second exhaust casing being fitted at the turbine casing when the rotary device is connected to the turbine output shaft.

* * * * *